(No Model.) 2 Sheets—Sheet 1.
A. PEASE.
COMBINED CULTIVATOR, HARROW, HORSE HOE, AND VINE PULLER.
No. 476,299. Patented June 7, 1892.
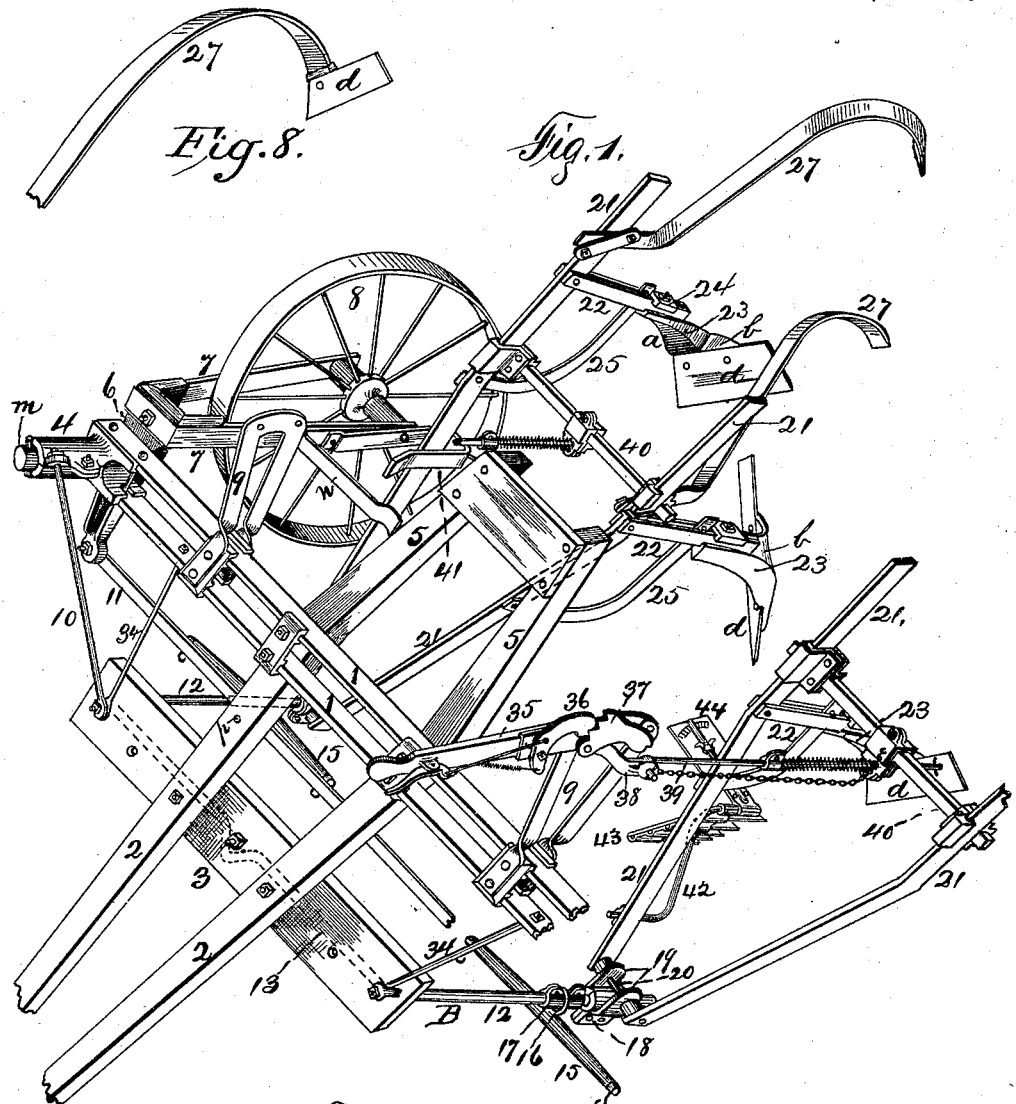
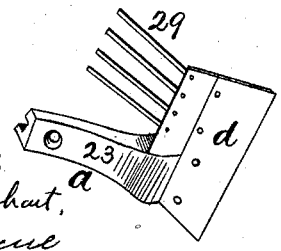
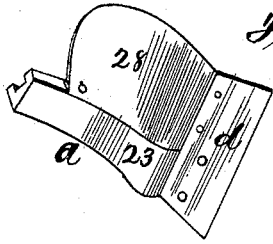
WITNESSES:
H. A. Carhart
C. B. Kinne
INVENTOR
Allen Pease
BY
Smith + Denison
his ATTORNEYS (No Model.) 2 Sheets—Sheet 2.
A. PEASE.
COMBINED CULTIVATOR, HARROW, HORSE HOE, AND VINE PULLER.
No. 476,299. Patented June 7, 1892.
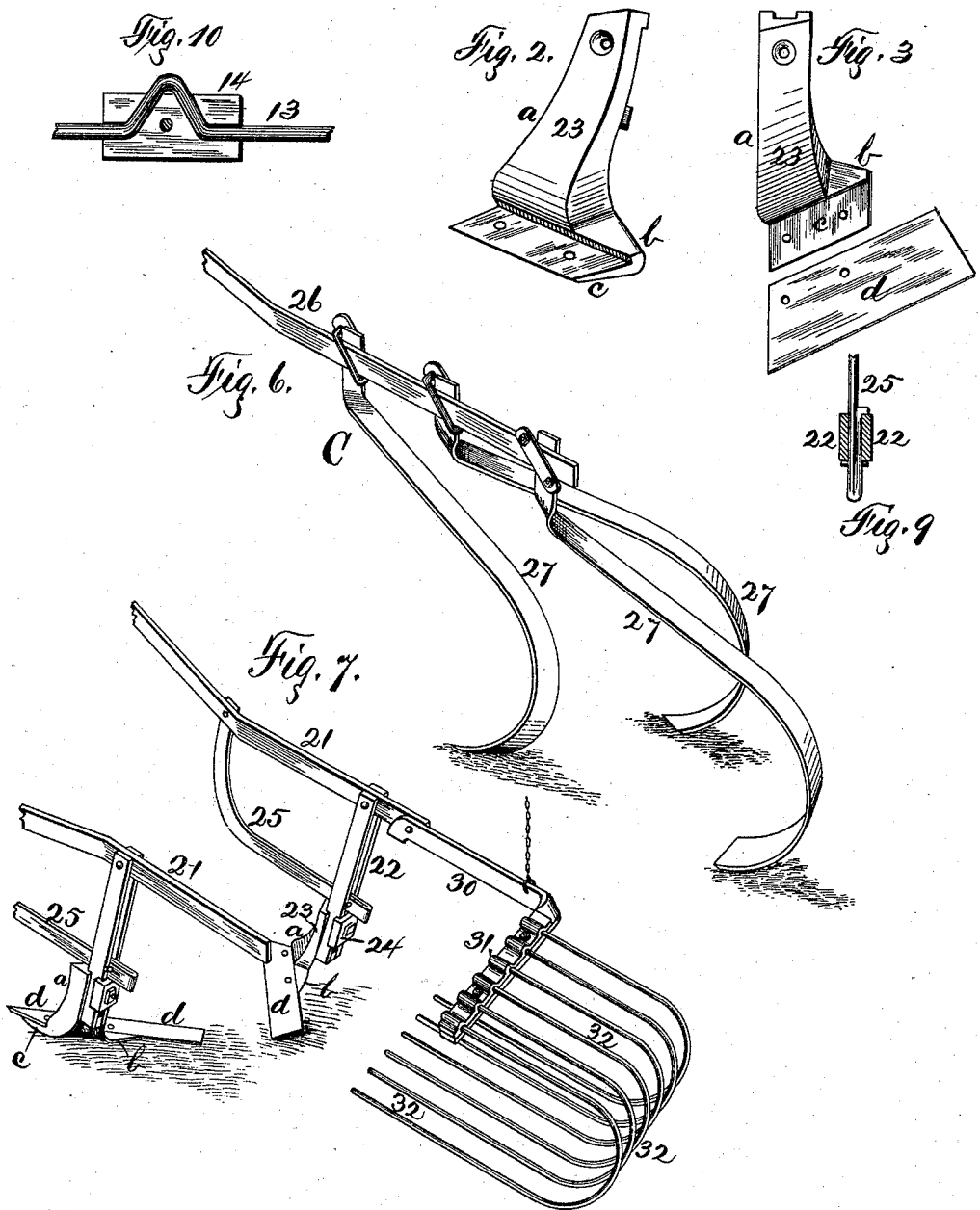

UNITED STATES PATENT OFFICE.

ALLEN PEASE, OF TRUMANSBURG, NEW YORK.

COMBINED CULTIVATOR, HARROW, HORSE-HOE, AND VINE-PULLER.

SPECIFICATION forming part of Letters Patent No. 476,299, dated June 7, 1892.

Application filed June 4, 1891. Serial No. 395,032. (No model.)

*To all whom it may concern:*

Be it known that I, ALLEN PEASE, of Trumansburg, in the county of Tompkins, in the State of New York, have invented new and useful Improvements in a Combined Cultivator, Harrow, Horse-Hoe, and Vine-Puller, of which the following, taken in connection with the accompanying drawings, is a full, clear, and exact description.

My invention relates to agricultural implements, and particularly to those employed in preparing ground for seeding, for cultivating it before and after seeding, for breaking it up and pulverizing it, for weeding and hilling up, furrowing, or marking out, for digging vegetables, and for other analogous purposes.

My object is to produce an implement adapted to be used for any or all of the purposes above specified.

My invention consists in the several novel features of construction and operation hereinafter described, and which are specifically set forth in the claims hereunto annexed.

It is constructed as follows, reference being had to the accompanying drawings, in which—

Figure 1 is a top plan perspective with one of the wheels removed. Fig. 2 is a front plan perspective of a tooth-shank without the point. Fig. 3 is a front elevation of the shank and top plan of the point detached. Fig. 4 is a front elevation of the tooth with the point and also a mold-board attached. Fig. 5 is an elevation of the tooth and point and fingers projecting rearward therefrom as when used as a potato, onion, turnip, or root digger. Fig. 6 is an elevation of the harrow attachment, showing multiple teeth upon one draw-bar. Fig. 7 is an elevation showing two of the rigid teeth and my bean-pulling attachment connected to one of the tooth draw-bars and part of the chain for lifting and dumping the puller. Fig. 8 shows a part of a spring-harrow tooth and a wing-point attached thereto. Fig. 9 is a detail of the joint connecting the brace to the beams which carry the shanks of the rigid teeth. Fig. 10 is a detail of the joint between the main draw-bar and the cross-bar upon the front of the machine, whereby a certain vertical movement of the tooth draw-bars is permitted.

A is the main frame, comprising the cross-beams 1, the pole-pieces 2, and the draft-beam 3, said cross-beams being secured to the tubular posts 4, one at each end, and the seat-supports 5 being also secured to said frame, and said tubular posts are sectional vertically, as shown, and secured to the beams 1, and the forks 7, in which the supporting-wheels 8 are journaled, are secured to the plates 6, said plates having, also, vertical shafts $m$, which form the point upon which the forks and wheels rotate like a caster-wheel, when desired, when pressure is applied to the stirrup-lever $n$, secured to one of the fork-bars 7 by the foot of the operator. Brackets 9 are also secured to the cross-beams 1; also, the front ends of each of the plates 6 are secured to the cross-bar 11, which is in turn detachably secured to one of the pole-pieces by the bolt $p$, and when this is removed the swing of one wheel is imparted to the other.

B is the main draw-bar, consisting of the vertical posts 12, the cross-bar 13 beneath the draft-beam and bent centrally, as shown in Fig. 10, and there fitting into a groove cast in a plate 14, which is secured beneath said beam with the angle standing forward.

The whiffletrees 15 are each provided with a draft-eye 16, fitting over a post 12 and adjustable vertically thereon by moving the collar 17 on said posts. A tubular box 18 is secured upon the bottom of each post and is provided with rear flanges 19, in which the shaft 20 is journaled and upon which shaft I mount the ends of the tooth-bars 21, which diverge from each other in order to give proper space between the teeth.

As shown in Fig. 7, parallel bars 22 are secured to the tooth-bars, and the tooth-shanks 23 are secured to their lower ends by means of a bolt through the shank, through between the bars, and through a span-plate 24, flanged to fit over the outer sides of the bars, and by loosening the bolt the shank is adjustable vertically. Each shank has on its rear vertical edges flanges which fit over the sides of said bars; has a front face beveled back from the edge $a$ to the opposite side, so that the edge $a$ is always a cutting-edge, and this face is a partial mold-board; has a side lug $b$ on one side, a front flange $c$, and a rabbeted seat across the flange and lug, as shown, to receive the point-piece $d$, which consists of a piece or plate of metal having its front edge sharpened and beveled, so that the whole device so constructed is an undercutting-tooth for killing weeds or breaking and loosening up the soil. A brace 25, Figs. 7 and 9, is secured to the tooth-bar 21 and extends back between the bar 22, having its rear end folded and a lip turned upon the fold-back, said lip resting against the front of the bars 22, and a pin through the rear portion behind the bars. As thus constructed my machine is simply one for undercutting the roots of weeds and loosening up the soil, like a cultivator.

To further pulverize the soil and break it away from the weeds, I secure the harrow attachment C to the rear end of each tooth-bar, comprising a draw-bar 26, to which I secure one or more spring-teeth 27, and when more than one tooth is used I twist them close to the shank, so that they do not follow each other, but each operates independently and in a different line from the other, so that while in Fig. 1 I show only one spring-tooth for each rigid one by substituting the construction shown in Fig. 6 I have three spring-teeth for each rigid or cutting tooth, which insures the perfect pulverizing of the soil and the separation thereof from the weeds.

In Fig. 4 I show a mold-board 28, secured to the shank-point for turning a furrow, as a hiller, or for other purposes.

In Fig. 5 I show bars 29, secured to the point and projecting rearward, thus producing a potato, onion, or turnip digger.

In Fig. 7 I show my bean, turnip, or vegetable or vine puller attached pivotally to the tooth-bar 21 and comprising a beam 30, bent at a right angle, a top plate 31, notched transversely, and teeth 32, having one end secured in the notches and bent substantially as shown, so that while the rigid tooth undercuts the row and loosens up the soil the pulling-teeth will readily pull the bean or other vines, collect them in the bend, and then by lifting the puller by means of the chain 33 and suitable mechanism for operating it (not shown) the vines are dumped in windrows, like a hay-rake. Braces 34 also connect the draft-beam to the cross-beams.

Upon each bracket 9 I mount my mechanism for lifting the rigid teeth, harrow-teeth, and pullers on one side from the ground, comprising a lever 35, a pawl 36, a quadrant-rack 37, and a crank-arm 38, connected to the lever and itself connected by the rod 39 to the cross-bar 40, which is secured to the tooth-bars 21.

In Fig. 1 at 41 I show a vertical bar secured to the wheel-yoke and operating to guide the tooth-bars in their vertical movements.

In Fig. 8 I show my point-piece secured transversely to the spring-tooth, so that it operates as an under-cutter and a spring-tooth combined.

Chains 42 are connected at one end to the cross-bar 40 and at the other end to the crank-arm 38 in any ordinary manner, and these carry the tooth-bars 21, while the springs on the rods 39 tend to force them down, but yieldingly, and the depth of the cut can be regulated either by shortening or lengthening the chain or by moving the lever 35.

The beams 1, cross-bar 11, and draft-beam may be provided with additional bolt-holes, so that the tubular posts 4 can be moved in to narrow the space between the wheels and the braces 10 and 34 shifted accordingly. By the removal of the bolt $p$ the cross-bar 11 is released, so that it operates as a connecting-rod between the wheel-mountings, so that when the pressure-bar $n$ is forced forward or pulled back both wheels are swung upon the pivots $m$ to one side or the other, and thus guided, which is very essential in the cultivation of crops planted in rows, enabling me to dodge a hill which is out of line.

In Fig. 1 I show a crank-shaped bar 42, pivotally connected to the bar 21 and secured by a thumb-screw (not shown) and carrying upon its rear end a rake-beam 43, provided with teeth, and also a plate 44, standing at an angle to the rake and in rear thereof, said rake being adjusted to work closer to the row than the regular teeth and break up the soil, while the plate 44 will level the ground, pull the loosened weeds, and deflect them to one side.

What I claim as my invention, and desire to secure by Letters Patent, is—

1. The combination, with the main frame and the sectional tubular posts upon its ends, of vertical shafts journaled therein, plates carrying said shafts and connected in front to the transverse cross-bars 11, wheel-forks in the downward extension from said plate, wheels journaled therein, and stirrups secured to said forks, whereby said wheels are swung simultaneously.

2. The combination, with the main frame, the pole, and draft-beam secured thereto, of the draw-bar consisting of two vertical posts connected at their upper ends by a cross-bar angularly bent at its center, and a grooved plate receiving the angular portion of said bar and means to secure it to the shaft-beam.

3. The combination, with the main frame, the pole, and draft-beam secured thereto, of the draw-bar consisting of two vertical posts connected at their upper ends by a cross-bar angularly bent at its center, and a grooved plate receiving the angular portion of said bar, secured beneath the draft-beam, and the diverging tooth-bars connected to the posts of said draw-bars.

4. The combination, with the main frame, the pole, and draft-beam secured thereto, of the draw-bar consisting of two vertical posts connected at their upper ends by a cross-bar angularly bent at its center, and a grooved plate receiving the angular portion of said bar, secured beneath the draft-beam, the diverging tooth-bars connected to the posts of said draw-bars, and plows supported by said tooth-bars.

5. The combination, with the main frame, the pole, and draft-beam secured thereto, of the draw-bar consisting of two vertical posts connected at their upper ends by a cross-bar angularly bent at its center, and a grooved plate receiving the angular portion of said bar, secured beneath the draft-beam, the diverging tooth-bars connected to the posts of said draw-bars, and plows supported by said tooth-bars, and vine-pullers connected to said tooth-bars in rear of the plows and operating together, substantially as set forth.

In witness whereof I have hereunto set my hand this 20th day of May, 1891.

ALLEN PEASE.

In presence of—
HOWARD P. DENISON,
C. W. SMITH.